United States Patent [19]

Schneider

[11] Patent Number: 4,966,424
[45] Date of Patent: Oct. 30, 1990

[54] CABINET CONSTRUCTION

[75] Inventor: Walter Schneider, Langnau, Switzerland

[73] Assignee: W. Schneider & Co., AG Metallwarenfabrik, Langnau, Switzerland

[21] Appl. No.: 345,351

[22] Filed: Apr. 28, 1989

[30] Foreign Application Priority Data

May 5, 1988 [CH] Switzerland .......................... 1706/88

[51] Int. Cl.$^5$ ............................................. A47B 47/00
[52] U.S. Cl. ................................. 312/265.6; 312/263; 403/403; 52/506
[58] Field of Search ................. 220/224, 76, 83, 85 K; 312/214, 265.5, 265.6, 257.1, 263, 264; 403/403, 402, 382; 52/506, 508

[56] References Cited

U.S. PATENT DOCUMENTS

| 742,593 | 10/1903 | Coghe | 403/403 |
| 1,868,573 | 7/1932 | Herman | 403/403 |
| 2,757,059 | 7/1956 | Forrest | 312/257.1 |
| 3,042,158 | 7/1962 | Michaels | 403/403 |
| 3,105,726 | 10/1963 | Jung | 312/265.6 |
| 3,314,741 | 4/1967 | Litner | 312/214 |
| 3,323,819 | 6/1967 | Barker | 403/403 |
| 3,408,127 | 10/1968 | Vincens | 312/204 |
| 3,883,027 | 5/1975 | Schneider . | |
| 4,461,519 | 7/1984 | Hildebrandt et al. | 312/265.6 |
| 4,621,879 | 11/1986 | Schneider | 312/258 |
| 4,804,877 | 2/1989 | Harwood | 312/137 |

FOREIGN PATENT DOCUMENTS

| 520054 | 1/1980 | Australia . |
| 0133605 | 2/1985 | European Pat. Off. . |
| 2727361 | 5/1979 | Fed. Rep. of Germany . |
| 3430497 | 10/1985 | Fed. Rep. of Germany ... 312/257.1 |

Primary Examiner—Kenneth J. Dorner
Assistant Examiner—Brian K. Green
Attorney, Agent, or Firm—Frishauf, Holtz, Goodman & Woodward

[57] ABSTRACT

To protect a base body (7) of the cabinet cover made of foamed plastic material, cover sheets (4), for example of sheet aluminum, are hooked over projecting edges of the side wall and overlapped with flaps (20) over the back wall (3) of the plastic base body. The corners of the cover sheets are angled-off in Z-shaped terminations (24) and connected to the base body by plastic elastic cover rails (6) connected to the base body (7) by snap-in projection-and-recess connections (12, 13; 8, 9), thereby providing a lightweight surface-protected cabinet which can be assembled simply and without requiring hand tools or assembly connectors such as screws or the like.

16 Claims, 2 Drawing Sheets

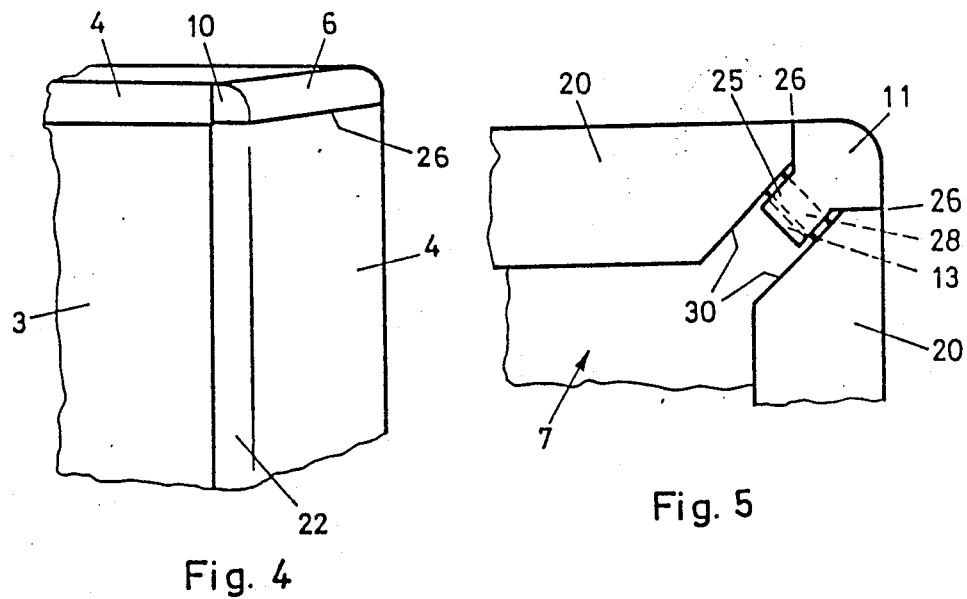
Fig. 4
Fig. 5
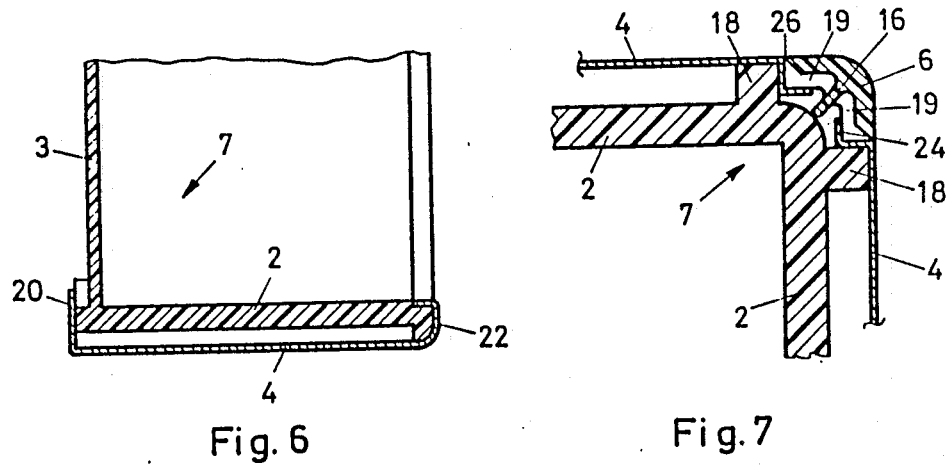
Fig. 6
Fig. 7
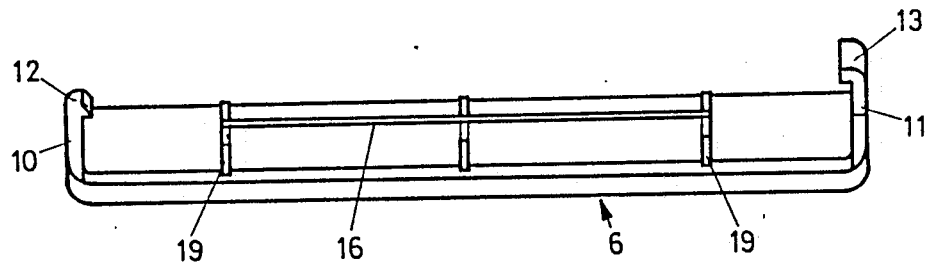
Fig. 8

CABINET CONSTRUCTION

REFERENCE TO RELATED PUBLICATION

European Patent No. 0 133 605 to which U.S. Pat. No. 4,621,897, Schneider, corresponds, the disclosure of which is hereby incorporated by reference.

FIELD OF THE INVENTION

The present invention relates to the construction of a cabinet, and more particularly to cabinets adapted for wall mounting, such as bathroom cabinets and the like.

BACKGROUND

Cabinets which are assembled of metal side wall elements connected together with corner connecting rails are known, see for example U.S. Pat. No. 4,621,897, to which European Patent EP 0 133 605 corresponds. The connecting rails are slid into longitudinal grooves shaped or formed in the side wall or back elements.

For many applications, it is desirable to provide lightweight material, such as plastic. Foamed plastic is particularly suitable and can easily be made to have decorative aspects. This material, however, is soft and requires protection.

THE INVENTION

It is an object to provide a cabinet construction which is capable of being made of stiff plastic material, typically foamed plastic material, and on which the framing or side walls can be covered with cover sheets of metal to provide a protective surface, the metal cover sheets and the plastic base body and/or an additional metal covering being connected by rail elements capable of being placed into grooves so that assembly is reliable and simple.

Briefly, a base body is provided which, for example, forms part of the back wall of the cabinet, and to which integral side walls are molded, all for example of foamed plastic material. Cover sheets of a material capable of protecting the side walls are provided, secured by connecting means, typically rails, which connect the cover sheets to the base body. The connecting rails are shaped corner connection rails, formed with integral lateral, oppositely located side portions which are positioned with respect to each other at an angle corresponding to the angle between adjacent side walls, and engaging against the cover sheet. For rectangular cabinets, this angle will be 90°. Front and back end pieces terminate the rails, connected by projection-and-recess interlocks formed on the end pieces of the base body to permit engagement of the base body after assembly of the cover sheets over the side walls. Typically, the projection-and-recess arrangement are snap hooks engaging in openings, or over abutment noses on the base body, so that it is only necessary to push the rails over the cover sheets, typically of aluminum sheet material, until a snap-in engagement is effected.

The arrangement has the advantage that the base body, for example the back wall, side walls, separating walls, ridges for shelves and the like, can be made as a single molded element, containing all the necessary features for the entire cabinet, and made of foamed plastic material so that it is very lightweight. The plastic material is so foamed that it is formed with a smooth surface. The outer "skin" of this plastic material, however, is relatively soft and this relatively soft outer skin is therefore covered with the metallic cover sheets which, in accordance with the invention, can readily be assembled to the foamed plastic body by a mere snap connection, and not requiring any tools. This permits rapid and low-cost manufacture of sturdy, damage-protected cabinets, typically bathroom cabinets, which further can be easily mounted.

DRAWINGS

FIG. 4 is a perspective pictorial view of a corner of the cabinet including cover sheets and an edge connecting rail;

FIG. 5 is a back view of the cabinet;

FIG. 6 is a cross-sectional view through a narrow side of the cabinet with a cover sheet attached;

FIG. 7 is a vertical sectional view through a corner of the cabinet; and

FIG. 8 is a perspective inside view of a corner connecting rail.

DETAILED DESCRIPTION

The invention will be described in connection with a bathroom cabinet but, of course, is equally applicable to different types of cabinets and, in general, for cabinet or storage structures. It has essentially rectangular side walls and a back wall 3.

Figure 1:
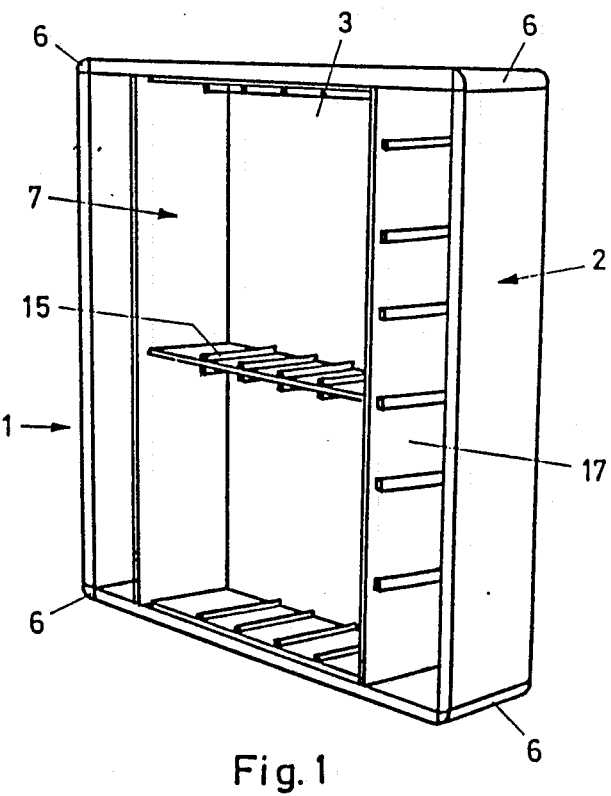
FIG. 1 is a perspective view of a bathroom cabinet embodying the invention.

The cabinet 1 (FIG. 1) may use a door which, in the illustration, is not secured, nor are the hinges attached. The cabinet 1 has four narrow side walls 2 and a back wall 3. It is made of a single base body 7, formed of foamed plastic. The base body 7 has at least one separating wall 17 and a shelf 15. The interior construction of the base body can be in accordance with any desired layout; for simplicity and clarity of the drawing, interior appointments of the cabinet have been omitted.

Figure 2:
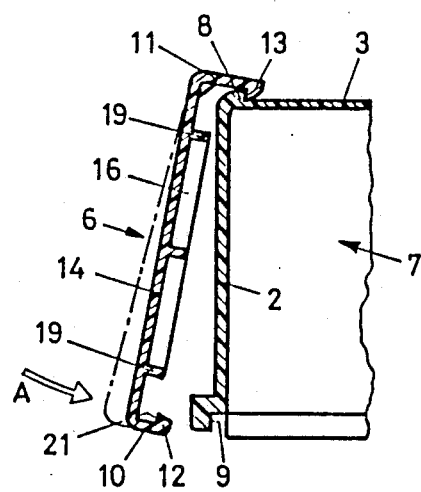
FIG. 2 is a cross-sectional view through an edge of the bathroom cabinet with a connecting rail about to be attached.
Figure 3:
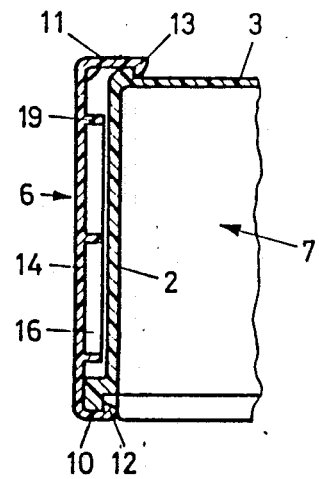
FIG. 3 is a view similar to FIG. 2, in which the connecting rail is attached.

The four narrow side walls 2 of the cabinet 1 are covered by sheets which are made from a material harder than the material of the base body 7, preferably by metallic cover sheets 4 which are coupled to the base body 7 at the corners by corner connecting rails 6 which, also, connect the cover sheets 4 together. FIG. 6 best illustrates the cover sheets 4 which are formed at the forward side of the cabinet with a generally U-shaped terminating portion 22, surrounding the forward edge of the base body of the cabinet. At the back side of the cabinet, the cover sheets 4 are bent over at a right angle (see also FIG. 5) to form back wall flaps 20. The corner connecting rails 6 have a front or head end 10 and back or tail end 11. The ends 10, 11 are formed with projecting fingers 12, 13. As best seen in FIGS. 2 and 3, the fingers 12, 13, together with projections or abutments 8, 9 formed on the base body 7, form projection-and-recess interengaging connections. To facilitate connecting the rails 6, at least one of the fingers, for example finger 12, is formed with an inclined surface 21. To connect the rails to the base body, one of the hook ends, for example the upper hook end 13 on finger 11 is hooked over the matching projection 8 on the base body, and the rail 6 is then moved in the direction of the arrow A (FIG. 2) to slip the rail in position (FIG. 3) and snap the projection 12 of finger 10 over the projection 9 on the base body 7. This can easily be done by slight pressure, the rails being elastic. Of course, the attachment can also be carried out in reverse, by first connecting finger 10 and then snapping finger 11 over the projection 8.

The edge portions 24 of the cover sheets 4 are profiled and bent over in essentially Z shape at their terminal regions, to engage behind ribs 18 of the base body 7, leaving a shoulder 27 (see FIG. 7). The corner connecting rail 6 has a longitudinal rib 16 which extends between the bent-over terminal portions 24, and which engages against an outwardly curved portion of the base body 7. A plurality of cross ribs 19 formed on the rail 6 engage against the Z-shaped angled-off terminal portions 24 and retain the terminal portions 24 in position, locked against shifting or other movement. The corner rails 6 may have differential shapes at their outside, in accordance with the designer's wishes; as shown, they are rounded to form quarter-rounds to engage flush and with only minimum gaps at junctions 26 against the outer surface of the cover sheets 4, forming a flush smooth connection. Rather than using a rounded, quarter-round outer shape, the outer contour of the rail 6 could have sharp corners, be part-polygonal, or otherwise formed as desired.

The terminal or end portions of the rails 6 close off the sides. The end finger or portion 10 is formed with an approximately quarter-round front plate (see FIG. 8) with flush connection to the U-shaped overlapping part 22 of the cover sheet 4 (see FIG. 6). The tail end, located at the back wall of the cabinet and forming part of the finger 11, has, in addition to the quarter-round plate-like element, a flap 25 (FIG. 5) with essentially parallel edges. The flap 25 engages between the edges 30 of the back flaps 20 of the cover sheets 4, the flaps being cut with a miter gap. Preferably, flap 25 and the cuts 30 have some play between each other. The projection 13 of the tail finger 11 engages in the recess 28 (FIG. 5) of the base body.

The cover sheets 4 may be made of sheet aluminum with an elox surface, in any desired color; the corner connecting rails 6 can be made of plastic, of matching or contrasting color to that of the cover sheets 4.

An easily assembled, lightweight and yet sturdy cabinet construction is provided, which does not require any tools for assembly, nor loose elements, such as screws, pins or the like.

Various changes and modifications may be made within the scope of the inventive concept. For example, rather than forming abutment projections 8, 9, the hook ends 12, 13 on the fingers 10, 11 could snap into openings formed in the base body 7.

I claim:

1. Cabinet construction, particularly bathroom cabinet
comprising the combination of
a base body (7) of plastic material having side walls subject to damage,
with
cover sheets (4) of a material capable of protecting the side walls (2) and covering the side walls, and
means (6, 20) for connecting the cover sheets to the base body (7),
wherein the connecting means includes
shaped corner connecting rails (6) formed with integral lateral oppositely located side portions which are positioned with respect to each other at an angle corresponding to an angle between adjacent side walls and engaging against the cover sheets (4),
said rails comprising elastic material,
front and back end pieces (10, 11) terminating said rails, and
projection-and-recess means (12, 13; 8, 9) formed on the end pieces (10, 11) and on the base body (7), respectively, to permit engagement of the rails (6) on the base body (7) after assembly of the cover sheets (4) over the side walls (2) of the base body (7).

2. The cabinet construction of claim 1, wherein said connecting rails comprise elastically resilient plastic material of sufficient elasticity to permit snap-in connection of said projection-and-recess means.

3. The cabinet construction of claim 2, wherein the projection-and-recess means includes projecting fingers (12, 13) formed on said rails;
and wherein at least one of said fingers is formed with an inclined side surface directed towards the recess means to facilitate snap-in connection.

4. The cabinet construction of claim 1, wherein the base body (7) comprises a unitary element;
and wherein the cover sheets (4) include sheet-metal elements having an essentially U-shaped end portion overlapping an edge of the side walls of the base body and a bent-over second terminating portion (20) angled over a back wall (3) of the base body.

5. The cabinet construction of claim 1, wherein the cover sheets (4) are formed with edge portions (24) adjacent the region of the corners of the cabinets, which edge portions (24) are angled-off in essentially Z-shape;
and wherein the connecting rails (6) are formed with cross ribs (19) engaging the edge portions (24) of the cover sheet and are further formed with a longitudinal rib (16) engaging against a corner region of the base body (7).

6. The cabinet construction of claim 1, wherein the corner connecting rails (6) define an outer corner surface which has two edge portions, each of which fit flush against the cover sheets (4) on adjacent side walls;
and wherein said corner connecting rails are formed with front and tail end portions (10, 11), the front end portion (10) having a quarter-round outer shape, and the tail end portion (11) being plate-like and include an extending flap (25) overlapping a back wall (3) of the base body (7).

7. The cabinet construction of claim 6, wherein the tail end portion (11) is formed with a projecting ridge (13) engaging with the base body (7).

8. The cabinet construction of claim 6, wherein the cover sheets (4) are formed with angled-off rear flaps (20) engaging over the back wall (3) of the base body, said rear flaps being formed with miter cuts located adjacent said flap (25) of the tail end portion of the rail (6).

9. The cabinet construction of claim 1, wherein the angle between adjacent side walls is 90°.

10. The cabinet construction of claim 1, wherein the base body comprises foamed plastic material.

11. The cabinet construction of claim 10, wherein the cover sheets comprise sheet aluminum.

12. The cabinet construction of claim 1, wherein said corner connecting rails (6) have a rounded outer surface.

13. The cabinet construction of claim 12, wherein said corner connecting rails (6) have a rounded outer surface, and said corner connecting rails are formed with front and tail end portions (10, 11), the front end portions (10) having a quarter-round outer shape, and the tail end portions (11) being plate-like and include an extending flap (25) overlapping a back wall (3) of the base body (7).

14. Cabinet construction comprising a base body (7) of plastic material having essentially rectangular side walls, metallic cover sheets (4) for protecting and covering the side walls (2), corner connecting rails (6) formed with integral front and back end pieces (10, 11) terminating said rails, said connecting rails being positioned between adjacent edge portions of the side walls and engaging against the cover sheets (4), projection-and-recess means (12, 13; 8, 9) formed on said end pieces (10, 11) and on the base body (7), respectively, to permit engagement of the rails (6) on the base body (7) after assembly of the cover sheets (4) over the side walls (2) of the base body (7), wherein said connecting rails comprise elastically resilient plastic material of sufficient elasticity to permit snap-in connection of said projection-and recess means;

the cover sheets (4) are formed with edge portions (24) adjacent the region of the corners of the cabinets, which edge portions (24) are angled-off in essentially Z-shape reaching behind a shoulder (27) of the base body (7);

wherein the connecting rails (6) are formed with ribs (19) engaging the edge portions (24) of the cover sheet; and wherein the corner rails (6) define an outer corner surface which has two edge portions, each of which fit flush against the cover sheets (4) on adjacent side walls.

15. The cabinet construction of claim 14, wherein the base body (7) comprises a unitary element;

and wherein the metallic cover sheets (4) have an essentially U-shaped end portion overlapping an edge of the side walls of the base body and a bent-over second terminating portion (20) angled over a back wall (3) of the base body.

16. The cabinet construction of claim 15, wherein the projection-and-recess means includes projecting fingers (12, 13) formed on said rails;

and wherein said at least one of said fingers is formed with an inclined side surface directed towards the recess means to facilitate snap-in connection.

* * * * *